2,990,398
HYDROXYETHYLATION OF POLYVINYL ALCOHOL
Harold K. Inskip, Buffalo, and Walter Klabunde, Lewiston, N.Y., assignors to E. I. du Pont de Nemours and Company, Wilmington, Del., a corporation of Delaware
No Drawing. Filed July 31, 1958, Ser. No. 752,186
2 Claims. (Cl. 260—91.3)

This invention relates to the hydroxyethylation of polyvinyl alcohol and in particular to an improved process for the production of hydroxyethylated polyvinyl alcohol.

It is well known that hydroxyethylated polyvinyl alcohol is useful as a permanently flexible, internally plasticized type of polyvinyl alcohol. The hydroxyethyl groups, which are usually introduced by reaction of ethylene oxide with the polyvinyl alcohol, are chemically bound to the product and so are not removable therefrom by physical methods such as evaporation, migration or extraction. In addition, films of certain hydroxyethylated polyvinyl alcohols are valuable for the preparation of water-soluble packages for materials such as detergents, bleaching agents, dyes and insecticides. For this use, the retention of strength and flexibility of the films under the extremes of temperature and humidity to which they may be exposed under various atmospheric conditions is of major importance.

In prior processes for the hydroxyethylation of polyvinyl alcohol, dry or moistened polyvinyl alcohol powder was treated with ethylene oxide as disclosed in U.S. Patent 1,971,662, granted August 28, 1934, to A. Schmidt and K. Eisfeld. We have found, however, that in the operation of this process, control of the reaction is difficult because of inadequate temperature control. This often leads to the formation of gummy, dark-colored products which are of little value in film or other applications.

These difficulties can be avoided by effecting the reaction of ethylene oxide with polyvinyl alcohol in aqueous solution as disclosed in the copending application of John N. Milne, Serial No. 597,882, filed July 16, 1956. While useful products are obtained by operation in this aqueous system, the hydroxyethylated polyvinyl alcohol is associated with significant amounts of ethylene glycol and polyethylene glycols formed by the reaction of ethylene oxide with the water. These materials have a plasticizing action on polyvinyl alcohol films, but since they are not chemically bound to the polyvinyl alcohol, they can be removed by physical methods and, hence, do not provide permanent plasticizing action. Thus, any ethylene oxide which reacts with the water represents material which is wasted in regard to the preparation of permanently flexible, hydroxyethylated polyvinyl alcohol. Moreover, in the aqueous system, the product is obtained as an aqueous solution. While this may be satisfactory if the hydroxyethylated polyvinyl alcohol is to be used at the site where it was prepared, the shipment of the relatively large amount of water associated with the product is costly. The water may be removed from the product by spray drying or drum drying, but this requires an additional operation in the process.

It is an object of this invention to provide an improved process for the production of hydroxyethylated polyvinyl alcohol. Another object is the hydroxyethylation of polyvinyl alcohol by a process which permits adequate control of the reaction temperature and which avoids tar formation. Another object is a process which yields a hydroxyethylated polyvinyl alcohol which is uncontaminated by ethylene glycol and polyethylene glycols. A further object is a hydroxyethylation process which permits efficient utilization of ethylene oxide and simple recovery of unreacted ethylene oxide. A still further object is the preparation of hydroxyethylated polyvinyl alcohol in a reaction medium which can be readily separated from the product. These and other objects will be apparent from the following description of our invention.

These objects are accomplished by effecting the hydroxyethylation of polyvinyl alcohol by heating a reaction mixture comprising polyvinyl alcohol, ethylene oxide, and an inert liquid diluent under autogenous pressure at a temperature from about 75° C. to about 150° C. By the use of the inert liquid diluent, the difficulties observed with control of the reaction and contamination by undesirable by-products in the prior processes are avoided. The hydroxyethylated product, being insoluble in the reaction mixture, may be readily separated by filtration or centrifugation.

By inert liquid diluent, we mean a substantially non-aqueous solvent for ethylene oxide which does not react with ethylene oxide or with polyvinyl alcohol under the conditions of the hydroxyethylation reaction. The diluent is a non-solvent for the polyvinyl alcohol and the hydroxyethylated polyvinyl alcohol. The diluent is preferably a liquid at room temperature (20–30° C.) but may be a solid provided its melting point is below about 75° C. which is the lower limit of the temperature range of the hydroxyethylation reaction. There is no upper limit on the boiling point of the diluent. However, diluents boiling below about 150° C. are generally preferred because they are readily volatilized from the hydroxyethylated polyvinyl alcohol after the reaction mixture has been filtered or centrifuged to remove the bulk of the diluent from the product. If the diluent is too high boiling to be readily volatilized from the hydroxyethylated product, it may be removed by washing the product with a low boiling solvent.

Among the diluents which can be used in our hydroxyethylation process are esters of organic carboxylic acids, ethers, paraffinic and aromatic hydrocarbons, halogenated hydrocarbons, halo- or nitro-substituted aromatic hydrocarbons, tertiary amides, sulfoxides, sulfones and nitriles. The following are specific examples of satisfactory diluents: methyl acetate, ethyl acetate, butyl acetate, methyl benzoate, diethyl ether, tetrahydrofuran, dioxane, hexane, benzene, toluene, carbon tetrachloride, trichloroethylene, chlorobenzene, nitrobenzene, dimethyl formamide, dimethyl acetamide, dimethyl sulfoxide, and acetonitrile. Water, alcohols, primary and secondary amines, primary and secondary amides, aldehydes and ketones are not satisfactory diluents because they may react with the ethylene oxide or polyvinyl alcohol under the reaction conditions.

The amount of diluent used should be sufficient to give a fluid slurry of solid polyvinyl alcohol. The amount of diluent required is about equal in weight to the polyvinyl alcohol, that is an amount equal to about 100% by weight based on the polyvinyl alcohol.

Small amounts of water, up to about 5% based on the polyvinyl alcohol, can be tolerated in the reaction mixture. Thus, the polyvinyl alcohol and the inert diluent need not be absolutely anhydrous and the commercially available materials are satisfactory. However, since ethylene oxide reacts with water, it is preferred to keep the water content of the mixture as low as practical.

An acidic or basic catalyst may be used to accelerate the reaction, but it is not essential. Examples of satisfactory catalyst, which may be used at about 0.5 to 5% based on the polyvinyl alcohol, are sulfuric acid, phosphoric acid, p-toluene sulfonic acid, triethylamine, triethanolamine and quaternary ammonium bases. It is preferable to have the catalyst soluble in the diluent.

When strongly basic catalysts are used, halogenated hydrocarbons should be avoided as diluents.

The reaction should be carried out under autogenous pressure at a temperature from about 75° C. to about 150° C., the preferred temperature range being 90° C. to 120° C. Temperatures above about 150° C. are not required since adequate reaction rates are obtained at lower temperatures; moreover such elevated temperatures may lead to by-product formation. With our inert diluent reaction mixture at temperatures below about 75° C. and at atmospheric pressure, no detectable hydroxyethylation was obtained in the presence or absence of catalysts. The reaction under autogenous pressure may be carried out in a shaker bomb, stirred autoclave, or any other equipment which is capable of withstanding the pressure and providing agitation of the reaction mixture.

The amount of ethylene oxide used should be sufficient to give the desired amount of chemically bound ethylene oxide in the product, that is, from about 10% to 50% by weight. The amount of ethylene oxide used thus should be at least 10% based on the polyvinyl alcohol and may be 50–100% or even higher, up to 200% based on the polyvinyl alcohol. The amount required is dependent on a number of factors including the time and temperature of the reaction, the presence or absence of a catalyst, the ethylene oxide concentration in the liquid phase of the reaction medium, and the particle size and reactivity of the polyvinyl alcohol. Any excess or unreacted ethylene oxide may be recovered by distillation from the reaction mixture after removal of the hydroxyethylated product. If desired, the reaction mixture, after removal of the product, may be used in a subsequent hydroxyethylation reaction by adding ethylene oxide to bring the concentration to the desired level.

By the term "polyvinyl alcohol," as used throughout the specification and appended claims, we mean those products obtained by the replacement of from 50% to 100% of the acetate groups of polyvinyl acetate by hydroxyl groups. This replacement may be accomplished by saponification, hydrolysis or alcoholysis. All viscosity grades of polyvinyl alcohol can be used in our process.

The invention is illustrated by the following examples which, however, are presented for illustration only and are not to be considered limitative. In the examples, all parts are by weight.

*Example 1*

In a 500 ml. 3-necked flask fitted with a gas inlet, stirrer, and reflux condenser at −78° C., were placed 60 grams of a completely hydrolyzed polyvinyl alcohol having a 4% aqueous solution viscosity of 4 to 6 centipoises at 20° C., 250 grams of methyl acetate, and 1.0 g. triethanolamine. A nitrogen atmosphere was maintained over the mixture as it was heated to reflux temperature (about 60° C.). Ethylene oxide, 25 grams, was then added and the mixture heated, with agitation, at reflux temperature for 6 hours. Examination of the product obtained by filtering the slurry and drying the solid indicated that no hydroxyethylation of the polyvinyl alcohol had occurred.

Repetition of Example 1 at reflux temperature using ethyl acetate and tetrahydrofuran as inert diluents with the same catalyst, and with tetrahydrofuran in the presence of potassium hydroxide as catalyst likewise failed to result in any hydroxyethylation.

*Example 2*

In a stainless steel shaker bomb precooled to 0° C. were placed 100 parts of polyvinyl alcohol (same type as in Example 1) and 200 parts of ethylene oxide. The bomb was sealed and then placed in a shaker rack, oscillating at a rate of 60 cycles per minute. The bomb was heated to about 100° C. An exothermic reaction occurred which raised the temperature to 280° C. and yielded a dark brown, viscous tar.

Repetition of Example 2 using a polyvinyl alcohol prepared by replacement of 86–89% of the acetate groups of polyvinyl acetate by hydroxyl groups and having a 4% aqueous solution viscosity of 4–6 centipoises at 20° C., likewise led to an uncontrolled reaction after the bomb was heated to 90° C.

*Example 3*

In a stainless steel shaker bomb precooled to 0° C. were placed 40 parts of polyvinyl alcohol (same type as in Example 1), 140 parts of ethyl acetate and 20 parts of ethylene oxide. The bomb was sealed and agitated as in Example 2. The bomb was heated to 90° C. and maintained at 88–91° C. for 6.5 hours. It was then cooled and the contents filtered to recover the solid product. The dried product was a cream colored, fine powder, containing 10% combined ethylene oxide.

*Example 4*

Example 3 was repeated except that the time of heating was 6.7 hours and the temperature was 99–102° C. The product contained 25% combined ethylene oxide.

*Example 5*

Example 3 was repeated using 0.6 part of sulfuric acid as catalyst. The product contained 22% combined ethylene oxide.

*Example 6*

In a stainless steel shaker bomb precooled to 0° C. were placed 40 parts of polyvinyl alcohol (same type as in Example 1), 140 parts of methyl acetate and 20 parts of ethylene oxide. The bomb was heated to 115° C. and maintained at 113–117° C. for 17 hours. The product contained 31% combined ethylene oxide.

*Example 7*

In a stainless steel shaker bomb precooled to 0° C. were placed 40 parts of polyvinyl alcohol prepared by replacement of 86–89% of the acetate groups of polyvinyl acetate by hydroxyl groups and having a 4% aqueous solution viscosity of 4–6 centipoises at 20° C., 138 parts of methyl acetate, 20 parts of ethylene oxide, and 2.0 parts of triethanolamine as catalyst. The bomb was heated at 110° C. for 7 hours. The product contained 29% combined ethylene oxide.

*Example 8*

Example 7 was repeated using 40 parts of polyvinyl alcohol of the type used in Example 1. The product contained 30% combined ethylene oxide.

*Example 9*

Example 7 was repeated using 40 parts of a completely hydrolyzed grade of polyvinyl alcohol having a 4% aqueous solution viscosity of 28–32 centipoises at 20° C. The product contained about 30% combined ethylene oxide.

These examples indicate the uncontrolled reaction obtained in the absence of our inert diluent (Example 2) and the absence of hydroxyethylation when the reaction is carried out at atmospheric pressure (Example 1). By our process, as illustrated in Examples 3–9, an easily controlled reaction is obtained which yields hydroxyethylated polyvinyl alcohol which is uncontaminated by undesired reaction products of ethylene oxide and which is readily separated from the reaction mixture. The hydroxyethylated polyvinyl alcohol prepared by our process is of value in uses such as water-soluble packaging film, greaseproof coatings, textile sizes and finishes, pigmented coatings, and other applications where a permanently flexible polyvinyl alcohol is desirable.

We claim:

1. A process for the production of hydroxyethylated polyvinyl alcohol containing from about 10% to about 50% by weight of chemically bound ethylene oxide comprising heating a reaction mixture comprising polyvinyl alcohol, from 10 to 200% by weight based on said polyvinyl alcohol of ethylene oxide, and at least about 100% by weight based on said polyvinyl alcohol of an inert liquid diluent selected from the group consisting of methyl acetate and ethyl acetate, under autogenous pressure at a temperature from about 75° C. to about 150° C. and mechanically separating the insoluble hydroxyethylated polyvinyl alcohol containing from about 10% to about 50% by weight of chemically bound ethylene oxide from the reaction mixture.

2. The process of claim 1 in which the temperature is 90° C. to 120° C.

References Cited in the file of this patent

UNITED STATES PATENTS

| | | |
|---|---|---|
| 1,971,662 | Schmidt et al. | Aug. 28, 1934 |
| 2,844,570 | Broderick | July 22, 1958 |
| 2,844,571 | Broderick | July 22, 1958 |